United States Patent
Hsu

(10) Patent No.: US 7,406,062 B2
(45) Date of Patent: Jul. 29, 2008

(54) METHOD FOR SELECTING A CHANNEL IN A WIRELESS NETWORK

(75) Inventor: Yi-Shou Hsu, Hsin-Chu (TW)

(73) Assignee: Realtek Semiconductor Corp., HsinChu (TW)

( * ) Notice: Subject to any disclaimer, the term of this patent is extended or adjusted under 35 U.S.C. 154(b) by 650 days.

(21) Appl. No.: 10/710,817

(22) Filed: Aug. 5, 2004

(65) Prior Publication Data

US 2005/0174963 A1 Aug. 11, 2005

(30) Foreign Application Priority Data

Feb. 10, 2004 (TW) ............................ 93103104 A

(51) Int. Cl.
*H04Q 7/00* (2006.01)
(52) U.S. Cl. .................. 370/329; 455/450; 455/455
(58) Field of Classification Search ................ 370/328, 370/329, 331, 332, 338, 341, 343, 908; 455/41.1, 455/41.2, 450, 452.1, 452.2, 453, 455
See application file for complete search history.

(56) References Cited

U.S. PATENT DOCUMENTS

| 3,806,819 | A | * | 4/1974 | Leonard | 455/179.1 |
|---|---|---|---|---|---|
| 4,166,927 | A | * | 9/1979 | Hamaoki | 455/455 |
| 6,011,960 | A | * | 1/2000 | Yamada et al. | 370/329 |
| 6,628,639 | B1 | | 9/2003 | Ishii | |
| 6,834,045 | B1 | * | 12/2004 | Lappetelainen et al. | 370/329 |
| 7,206,586 | B2 | * | 4/2007 | Kim et al. | 455/450 |

OTHER PUBLICATIONS

ISO/IEO 8802-11:1999/Amd 1:2000(E), IEEE Std 802.11a-2000, 17.3.8.3.3, Channelization, pp. 26-27.
IEEE Std 802.11b-1999/Cor 1-2001, Part 11:Wirelss LAN MAC AND PHY Specifications, 18.4.6., p. 3.

* cited by examiner

*Primary Examiner*—Quochien B Vuong
(74) *Attorney, Agent, or Firm*—Winston Hsu

(57) ABSTRACT

A method for selecting one channel from a plurality of channels in a wireless network system is disclosed. The channels include at least one in-use channel, a first idle channel, and a second idle channel. The method includes comparing the frequency band of the in-use channel with the frequency band of the first idle channel and the second idle channel to determine a first reference value for the first idle channel and a second reference value for the second idle channel, and comparing the first reference value with the second reference value to select one from the first idle channel and the second idle channel.

12 Claims, 1 Drawing Sheet

METHOD FOR SELECTING A CHANNEL IN A WIRELESS NETWORK

BACKGROUND OF INVENTION

1. Field of the Invention

The present invention relates to wireless networks, and more specifically, to a method for selecting a channel in a wireless network.

2. Description of the Prior Art

Wireless networks are a popular field under development in modern technology. In a wireless network, a frequency band for receiving and transmitting signals can be divided into channels. For instance, a communication frequency band is divided into 12 channels according to the IEEE 802.11a standard, or into 14 channels according to the IEEE 802.11b standard.

A wireless network system generally includes more than one access point (AP), and each AP uses at least one channel. When an AP is turned on, it is required to search for at least one idle channel (i.e. a channel not being used by other APs) in the wireless network system in which it is located.

However in a wireless network system, channels generally overlap each other, so that a channel being used may interfere with neighboring idle channels. If the wireless network system has a plurality of idle channels, different channels may suffer from interferences of different degrees causing different APs to have different communication quality. Therefore, it is desirable to select an idle channel providing better communication quality among a plurality of idle channels.

Conventionally a method to select an idle channel involving detecting the interference on the idle channel is provided, in order to determine a communication quality value for the selected idle channel. If the quality value exceeds a predetermined threshold, the AP uses the corresponding idle channel to transmit signals, and if the quality value does not exceed the predetermined threshold, the AP continues detecting other idle channels until an idle channel having a communication quality value exceeding the threshold is found.

However, the aforementioned operation requires time for searching. In other words, the idle channel to be used cannot be determined immediately.

SUMMARY OF INVENTION

It is therefore one of the many objectives of the present invention to provide a method for selecting a channel in a wireless network system.

According to embodiments of the present invention, a method for selecting one channel from a plurality of channels in a wireless network system is disclosed. The channels include at least one in-use channel, a first idle channel, and a second idle channel. The method includes comparing the frequency band of the in-use channel with the frequency band of the first idle channel and the second idle channel to determine a first reference value for the first idle channel and a second reference value for the second idle channel, and comparing the first reference value with the second reference value to select one from the first idle channel and the second idle channel.

According to embodiments of the present invention, a method used in a wireless network system is disclosed, which includes detecting the status of a plurality of channels in the wireless network system to divide the channels into at least one in-use channel, a first idle channel, and a second idle channel, and comparing the frequency band of the in-use channel with the frequency band of the first idle channel and the second idle channel to determine a first reference value for the first idle channel and a second reference value for the second idle channel.

According to embodiments of the present invention, A method for selecting a channel from a plurality of channels in a wireless network system is disclosed. The channels comprise at least one in-use channel and at least one idle channel. The method comprises determining a reference value for each idle channel according to the distribution of the at least one in-use channel among the channels; and selecting a channel from the at least one idle channel according to the at least one reference value.

These and other objectives of the present invention will no doubt become obvious to those of ordinary skill in the art after reading the following detailed description of the embodiments that is illustrated in the various figures and drawings.

DETAILED DESCRIPTION

Figure 1:
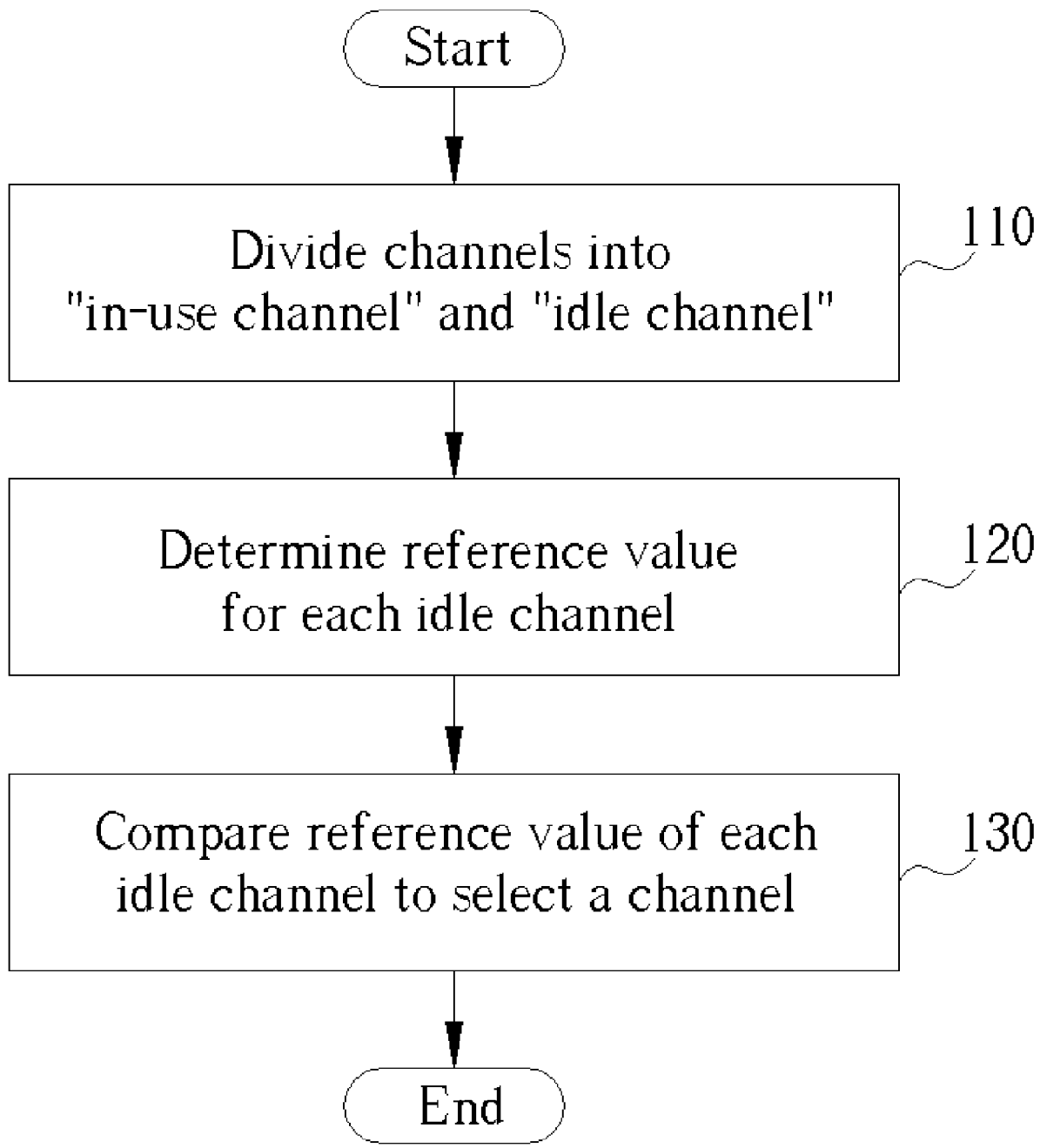
FIG. 1 is a flowchart of the method according to an embodiment of the present invention.

As described above, in a wireless network system, channels often overlap with other channels. That is, a channel being used interferes with neighboring idle channels. Additionally, the closer a channel being used is to an idle channel (i.e. the smaller the frequency difference between the two channels), the more serious the interference on the idle channel.

According to the IEEE 802.11b standard in which 14 channels are provided, assuming that the 14 channels are $C_1$, $C_2$, $C_3$, ... $C_{12}$, $C_{13}$, $C_{14}$ (where frequency increases in sequence with the channel subscript number), if channel $C_5$ is being used, the interference on channel $C_4$ is more serious than the interference on channel $C_3$. Similarly, the interference on channel $C_6$ is more serious than the interference on channel $C_7$. Accordingly, an embodiment of the present invention provides a mathematical algorithm to determine a reference value representing communication quality for each channel allowing one from a plurality of idle channels to be selected.

Please refer to FIG. 1 showing a flowchart of the method according to an embodiment of the present invention as follows:

Step 110: Detect the status of channels in a wireless network system using an AP to divide the channels into "in-use channels" and "idle channels".

Step 120: Determine a reference value for each idle channel according to the distribution of the in-use channels using mathematical calculation.

Step 130: Compare the reference values of the idle channels to select one channel for the AP to use.

Using the IEEE 802.11b standard as an example, assume that channel $C_2$ and channel $C_{10}$ are channels being used by other APs. In Step 110, channels $C_2$ and $C_{10}$ are classified as "in-use channels", and the remaining channels $C_1$, $C_3$, $C_4$, $C_5$, $C_6$, $C_7$, $C_8$, $C_9$, $C_{11}$, $C_{12}$, $C_{13}$, $C_{14}$ are classified as "idle channels." In Step 120, the reference value ($R_n$) is determined for each idle channel ($C_n$). Weighted calculation is hereby taken as an example, without limitation, as follows:

$$R_1 = 4xc_2 + 3xc_3 + 2xc_4 + 1xc_5 + 0xc_6 + 0xc_7 + 0xc_8 + 0xc_9 + 0xc_{10} + 0xc_{11} + 0xc_{12} + 0xc_{13} + 0xc_{14}$$

-continued $$R_3 = 3xc_1 + 4xc_2 + 4xc_4 + 3xc_5 + 2xc_6 + 1xc_7 + 0xc_8 + 0xc_9 + 0xc_{10} + 0xc_{11} + 0xc_{12} + 0xc_{13} + 0xc_{14}$$

$$R_4 = 2xc_1 + 3xc_2 + 4xc_3 + 4xc_5 + 3xc_6 + 2xc_7 + 1xc_8 + 0xc_9 + 0xc_{10} + 0xc_{11} + 0xc_{12} + 0xc_{13} + 0xc_{14}$$

$$R_5 = 1xc_1 + 2xc_2 + 3xc_3 + 4xc_4 + 4xc_6 + 3xc_7 + 2xc_8 + 1xc_9 + 0xc_{10} + 0xc_{11} + 0xc_{12} + 0xc_{13} + 0xc_{14}$$

$$R_6 = 0xc_1 + 1xc_2 + 2xc_3 + 3xc_4 + 4xc_5 + 4xc_7 + 3xc_8 + 2xc_9 + 1xc_{10} + 0xc_{11} + 0xc_{12} + 0xc_{13} + 0xc_{14}$$

$$R_7 = 0xc_1 + 0xc_2 + 1xc_3 + 2xc_4 + 3xc_5 + 4xc_6 + 4xc_8 + 3xc_9 + 2xc_{10} + 1xc_{11} + 0xc_{12} + 0xc_{13} + 0xc_{14}$$

$$R_8 = 0xc_1 + 0xc_2 + 0xc_3 + 1xc_4 + 2xc_5 + 3xc_6 + 4xc_7 + 4xc_9 + 3xc_{10} + 2xc_{11} + 1xc_{12} + 0xc_{13} + 0xc_{14}$$

$$R_9 = 0xc_1 + 0xc_2 + 0xc_3 + 0xc_4 + 1xc_5 + 2xc_6 + 3xc_7 + 4xc_8 + 4xc_{10} + 3xc_{11} + 2xc_{12} + 1xc_{13} + 0xc_{14}$$

$$R_{11} = 0xc_1 + 0xc_2 + 0xc_3 + 0xc_4 + 0xc_5 + 0xc_6 + 1xc_7 + 2xc_8 + 3xc_9 + 4xc_{10} + 4xc_{12} + 3xc_{13} + 2xc_{14}$$

$$R_{12} = 0xc_1 + 0xc_2 + 0xc_3 + 0xc_4 + 0xc_5 + 0xc_6 + 0xc_7 + 1xc_8 + 2xc_9 + 3xc_{10} + 4xc_{11} + 4xc_{13} + 3xc_{14}$$

$$R_{13} = 0xc_1 + 0xc_2 + 0xc_3 + 0xc_4 + 0xc_5 + 0xc_6 + 0xc_7 + 0xc_8 + 1xc_9 + 2xc_{10} + 3xc_{11} + 4xc_{12} + 4xc_{14}$$

$$R_{14} = 0xc_1 + 0xc_2 + 0xc_3 + 0xc_4 + 0xc_5 + 0xc_6 + 0xc_7 + 0xc_8 + 0xc_9 + 1xc_{10} + 2xc_{11} + 3xc_{12} + 4xc_{13}$$

wherein the parameters $c_1$ through $c_{14}$ correspond to channel $C_1$ through $C_{14}$, respectively. In this embodiment, the parameters indicate the status of their corresponding channels, respectively.

Since channel $C_2$ and channel $C_{10}$ are in-use channels and channels $C_1, C_3, C_4, C_5, C_6, C_7, C_8, C_9, C_{11}, C_{12}, C_{13}, C_{14}$ are idle channels, parameters $c_2$ and $c_{10}$ can be determined as 1, and parameters $c_1, c_3, c_4, c_5, c_6, c_7, c_8, c_9, c_{11}, c_{12}, c_{13}, c_{14}$ can be determined as 0. After calculation, the reference values are as follows: $R_1=4$, $R_3=4$, $R_4=3$, $R_5=5$, $R_6=2$, $R_7=2$, $R_8=3$, $R_9=4$, $R_{11}=4$, $R_{12}=3$, $R_{13}=2$, $R_{14}=1$. Therefore, channel $C_{14}$ is the one least interfered with by the in-use channels because it has the smallest reference value. In this way, in Step 130, channel $C_{14}$ is selected.

Please note that when calculating the reference values, formulae, parameters, and coefficients can be properly designed by system designers. For instance, the farther an idle channel is from an in-use channel, the smaller the interference on the idle channel by the in-use channel. Therefore, accumulating the intervals between an idle channel and all the in-use channels may also be used to determine the reference value of the idle channel. In the following embodiment, if the interval is longer than a certain level, the interval between the idle channel and the in-use channel is then set to be a fixed value. For instance, the interval over 4 is set to be 5 in the following description. By doing so, the degree of interference in the idle channel can also be determined, wherein the larger the reference value is, the better the communication quality the idle channel provides. Here is an example of such calculation:

$$R_1 = 1xc_2 + 2xc_3 + 3xc_4 + 4xc_5 + 5xc_6 + 5xc_7 + 5xc_8 + 5xc_9 + 5xc_{10} + 5xc_{11} + 5xc_{12} + 5xc_{13} + 5xc_{14}$$

$$R_3 = 2xc_1 + 1xc_2 + 1xc_4 + 2xc_5 + 3xc_6 + 4xc_7 + 5xc_8 + 5xc_9 + 5xc_{10} + 5xc_{11} + 5xc_{12} + 5xc_{13} + 5xc_{14}$$

$$R_4 = 3xc_1 + 2xc_2 + 1xc_3 + 1xc_5 + 2xc_6 + 3xc_7 + 4xc_8 + 5xc_9 + 5xc_{10} + 5xc_{11} + 5xc_{12} + 5xc_{13} + 5xc_{14}$$

$$R_5 = 4xc_1 + 3xc_2 + 2xc_3 + 1xc_4 + 1xc_6 + 2xc_7 + 3xc_8 + 4xc_9 + 5xc_{10} + 5xc_{11} + 5xc_{12} + 5xc_{13} + 5xc_{14}$$

$$R_6 = 5xc_1 + 4xc_2 + 3xc_3 + 2xc_4 + 1xc_5 + 1xc_7 + 2xc_8 + 3xc_9 + 4xc_{10} + 5xc_{11} + 5xc_{12} + 5xc_{13} + 5xc_{14}$$

$$R_7 = 5xc_1 + 5xc_2 + 4xc_3 + 3xc_4 + 2xc_5 + 1xc_6 + 1xc_8 + 2xc_9 + 3xc_{10} + 4xc_{11} + 5xc_{12} + 5xc_{13} + 5xc_{14}$$

$$R_8 = 5xc_1 + 5xc_2 + 5xc_3 + 4xc_4 + 3xc_5 + 2xc_6 + 1xc_7 + 1xc_9 + 2xc_{10} + 3xc_{11} + 4xc_{12} + 5xc_{13} + 5xc_{14}$$

$$R_9 = 5xc_1 + 5xc_2 + 5xc_3 + 5xc_4 + 4xc_5 + 3xc_6 + 2xc_7 + 1xc_8 + 1xc_{10} + 2xc_{11} + 3xc_{12} + 4xc_{13} + 5xc_{14}$$

$$R_{11} = 5xc_1 + 5xc_2 + 5xc_3 + 5xc_4 + 5xc_5 + 5xc_6 + 4xc_7 + 3xc_8 + 2xc_9 + 1xc_{10} + 1xc_{12} + 2xc_{13} + 3xc_{14}$$

$$R_{12} = 5xc_1 + 5xc_2 + 5xc_3 + 5xc_4 + 5xc_5 + 5xc_6 + 5xc_7 + 4xc_8 + 3xc_9 + 2xc_{10} + 1xc_{11} + 1xc_{13} + 2xc_{14}$$

$$R_{13} = 5xc_1 + 5xc_2 + 5xc_3 + 5xc_4 + 5xc_5 + 5xc_6 + 5xc_7 + 5xc_8 + 4xc_9 + 3xc_{10} + 2xc_{11} + 1xc_{12} + 1xc_{14}$$

$$R_{14} = 5xc_1 + 5xc_2 + 5xc_3 + 5xc_4 + 5xc_5 + 5xc_6 + 5xc_7 + 5xc_8 + 5xc_9 + 4xc_{10} + 3xc_{11} + 2xc_{12} + 1xc_{13}$$

wherein the parameters $c_1$ through $c_{14}$ correspond to channel $C_1$ through $C_{14}$, respectively. Similar to the previous embodiment, the parameters herein indicate the status of their corresponding channels, respectively.

Similarly, since channel $C_2$ and channel $C_{10}$ are in-use channels and channels $C_1, C_3, C_4, C_5, C_6, C_7, C_8, C_9, C_{11}, C_{12}, C_{13}, C_{14}$ are idle channels, parameters $c_2$ and $c_{10}$ can be determined as 1, and parameters $c_1, c_3, c_4, c_5, c_6, c_7, c_8, c_9, c_{11}, c_{12}, c_{13}, c_{14}$ can be determined as 0. After calculation, the reference values are as follows: $R_1=6$, $R_3=6$, $R_4=7$, $R_5=8$, $R_6=8$, $R_7=8$, $R_8=7$, $R_9=6$, $R_{11}=6$, $R_{12}=7$, $R_{13}=8$, $R_{14}=9$. Therefore, channel $C_{14}$ is the channel least interfered with by in-use channels because it has the largest reference value, so that in Step 130, channel $C_{14}$ is selected.

The method according to embodiments of the present invention utilizes a mathematical calculation to determine a reference value for each idle channel according to the distribution of the in-use channels in order to select an optimal idle channel by comparing the reference values.

Those skilled in the art will readily observe that numerous modifications and alterations of the device may be made while retaining the teachings of the invention. Accordingly, the above disclosure should be construed as limited only by the metes and bounds of the appended claims.

What is claimed is:
1. A method for selecting one channel from a plurality of channels in a wireless network system, the channels including at least one in-use channel, a first idle channel, and a second idle channel, the method comprising:
  determining a first reference value for the first idle channel and a second reference value for the second idle channel by comparing the frequency band of the in-use channel with the frequency band of the first idle channel and the frequency band of the second idle channel; and
  comparing the first reference value with the second reference value to select one from the first idle channel and the second idle channel.

2. The method of claim 1, further comprising:
  detecting the channels to identify the in-use channel, the first idle channel, and the second idle channel.

3. The method of claim 1, wherein if the frequency band interval between the in-use channel and the first idle channel is shorter than that between the in-use channel and the second idle channel, the first reference value is larger than the second reference value.

4. The method of claim 3, wherein the channel selected from the first idle channel and the second idle channel is the one having a smaller reference value.

5. The method of claim 1, wherein if the frequency band interval between the in-use channel and the first idle channel is shorter than the frequency band interval between the in-use channel and the second idle channel, the first reference value is smaller than the second reference value.

6. The method of claim 5, wherein the channel selected from the first idle channel and the second idle channel is the one having a larger reference value.

7. A method used in a wireless network system, the method comprising:
  detecting the status of a plurality of channels in the wireless network system to divide the channels into at least one in-use channel, a first idle channel, and a second idle channel; and
  comparing the frequency band of the in-use channel with the frequency band of the first idle channel and the second idle channel to determine a first reference value for the first idle channel and a second reference value for the second idle channel.

8. The method of claim 7, further comprising:
  comparing the first reference value with the second reference value to select one from the first idle channel and the second idle channel.

9. The method of claim 8, wherein if the frequency band interval between the in-use channel and the first idle channel is shorter than the frequency band interval between the in-use channel and the second idle channel, the first reference value is larger than the second reference value.

10. The method of claim 9, wherein the channel selected from the first idle channel and the second idle channel is the one having a smaller reference value.

11. The method of claim 8, wherein if the frequency band interval between the in-use channel and the first idle channel is shorter than the frequency band interval between the in-use channel and the second idle channel, the first reference value is smaller than the second reference value.

12. The method of claim 11, wherein the channel selected from the first idle channel and the second idle channel is the one having a larger reference value.

* * * * *